United States Patent
Diamanti et al.

(10) Patent No.: US 10,897,499 B2
(45) Date of Patent: Jan. 19, 2021

(54) RESOLVING STATUS AND SYNCHRONIZATION DISCREPANCIES IN A DISTRIBUTED COMPUTING ENVIRONMENT USING BLOCKCHAINS

(71) Applicant: INTERNATIONAL BUSINESS MACHINES CORPORATION, Armonk, NY (US)

(72) Inventors: Gary F. Diamanti, Wake Forest, NC (US); Aaron K. Baughman, Silver Spring, MD (US); Mauro Marzorati, Lutz, FL (US); Jorge Alonso Hernandez Nevarez, Tlaquepaque (MX)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 15/960,832

(22) Filed: Apr. 24, 2018

(65) Prior Publication Data
US 2019/0327299 A1    Oct. 24, 2019

(51) Int. Cl.
*H04L 29/08* (2006.01)

(52) U.S. Cl.
CPC ...... *H04L 67/1095* (2013.01); *H04L 67/1097* (2013.01); *H04L 67/16* (2013.01)

(58) Field of Classification Search
CPC .. H04L 67/1095; H04L 67/1097; H04L 67/16
See application file for complete search history.

(56) References Cited

U.S. PATENT DOCUMENTS

| | | | |
|---|---|---|---|
| 9,397,902 B2 * | 7/2016 | Dragon | H04L 43/04 |
| 9,838,240 B1 * | 12/2017 | Cormie | G06F 3/0607 |
| 2016/0217436 A1 | 7/2016 | Brama | |
| 2016/0261404 A1 | 9/2016 | Ford et al. | |
| 2016/0292672 A1 * | 10/2016 | Fay | G06Q 20/36 |
| 2016/0342989 A1 | 11/2016 | Davis | |
| 2017/0005804 A1 | 1/2017 | Zinder | |
| 2017/0091397 A1 | 3/2017 | Shah | |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Dhairya A Patel
(74) *Attorney, Agent, or Firm* — Nicholas Bowman; Andrew D. Wright; Roberts Calderon Safran & Cole, P C.

(57) ABSTRACT

A computer-implemented method including: monitoring, by a computing device, transactions in a blockchain, wherein the transactions are associated with a set of data replicated across a plurality of component members in a distributed computing environment; determining, by the computing device, a status of each of the cloud component members based on the monitoring; determining, by the computing device, a discrepancy in the status between a first component member of the plurality of component members, and a second component member of the plurality of component members; resolving, by the computing device, the discrepancy in the status; and updating, by the computing device, the blockchain to reflect the resolved discrepancy.

19 Claims, 8 Drawing Sheets

(56) References Cited

U.S. PATENT DOCUMENTS

| | | |
|---|---|---|
| 2017/0103468 A1 | 4/2017 | Orsini et al. |
| 2017/0163733 A1 | 6/2017 | Grefen et al. |
| 2018/0260125 A1* | 9/2018 | Botes ...................... G06F 3/067 |
| 2019/0013933 A1* | 1/2019 | Mercuri .............. G06F 11/3476 |
| 2019/0114182 A1* | 4/2019 | Chalakudi ............. H04L 9/0618 |
| 2019/0146884 A1* | 5/2019 | Gangadharappa .. G06F 11/1469 |
| | | 711/162 |
| 2019/0172026 A1* | 6/2019 | Vessenes ............... H04L 9/3247 |
| 2019/0333031 A1* | 10/2019 | Kravitz ................ G06Q 20/401 |

OTHER PUBLICATIONS

Arnold et al., "Cloud Customer Architecture for Blockchain", Cloud Standards Customer Council, http://www.cloud-council.org/deliverables/cloud-customer-architecture-for-blockchain.htm, 2017, 18 pages.

"Cloud Customer Architecture for Blockchain", Cloud Standards Customer Council, https://www.youtube.com/watch?v=a4pfF66GvW0, published Jul. 18, 2017, 1 page.

"Blockchain and Distributed Ledger Technology", SAP, https://www.sap.com/products/leonardo/blockchain.html, accessed Apr. 19, 2018, 12 pages.

\* cited by examiner

RESOLVING STATUS AND SYNCHRONIZATION DISCREPANCIES IN A DISTRIBUTED COMPUTING ENVIRONMENT USING BLOCKCHAINS

BACKGROUND

The present invention generally relates to resolving status and synchronization discrepancies in a distributed environment, more particularly, to resolving status and synchronization discrepancies in a distributed environment using blockchains.

As computer-based applications and services hosted in cloud environment settings become more and more distributed and complex, their level of dependency on external services and service providers continues to increase. For example, data processing, in connection with an application or service provided by a service provider, often takes place outside of the service provider's network. Data is replicated/synced across multiple components and networks in order for all involved applications to provide necessary services for clients with accurate results. In other words, multiple different components within different service provider cloud networks may be interdependent for providing applications and services.

SUMMARY

In an aspect of the invention, a computer-implemented method includes: monitoring, by a computing device, transactions in a blockchain, wherein the transactions are associated with a set of data replicated across a plurality of component members in a distributed computing environment; determining, by the computing device, a status of each of the component members based on the monitoring; determining, by the computing device, a discrepancy in the status between a first component member of the plurality of component members, and a second component member of the plurality of component members; resolving, by the computing device, the discrepancy in the status; and updating, by the computing device, the blockchain to reflect the resolved discrepancy.

In an aspect of the invention, there is a computer program product for resolving status and synchronization discrepancies in a distributed computing environment. The computer program product includes a computer readable storage medium having program instructions embodied therewith, the program instructions executable by a computing device to cause the computing device to: monitor transactions in a blockchain, wherein the transactions are associated with a set of data replicated across a plurality of component members within a distributed computing services system; determine a synchronization status of each of the component members based on the monitoring; determine synchronization status discrepancies of the set of replicated data between the plurality of component members; output information identifying the synchronization status discrepancies, wherein the outputting the information identifies particular ones of the plurality of component members having discrepant synchronization statuses; receive input to resolve the discrepant synchronization statuses, wherein the input is based on the outputted information identifying the synchronization status discrepancies; and update the blockchain to reflect the resolved discrepant synchronization statuses.

In an aspect of the invention, a system includes: a CPU, a computer readable memory and a computer readable storage medium associated with a computing device; program instructions to monitor first transactions in a first blockchain, wherein the first transactions are associated with a set of data replicated across a plurality of component members in a distributed computing service system; program instructions to update second transactions in a second blockchain based on the monitoring the first transactions, wherein the second transactions identify synchronization relationship statuses between the data replicated across a plurality of component members; program instructions to determine synchronization status discrepancies of the set of replicated data between the plurality of component members based on the second transactions; program instructions to output information identifying the synchronization status discrepancies, wherein the outputting the information identifies particular ones of the plurality of component members having discrepant synchronization statuses; program instructions to iteratively resolve each of the synchronization status discrepancies; and program instructions to iteratively update the first blockchain to reflect the resolved discrepancy, and the second blockchain based on updating the first blockchain. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
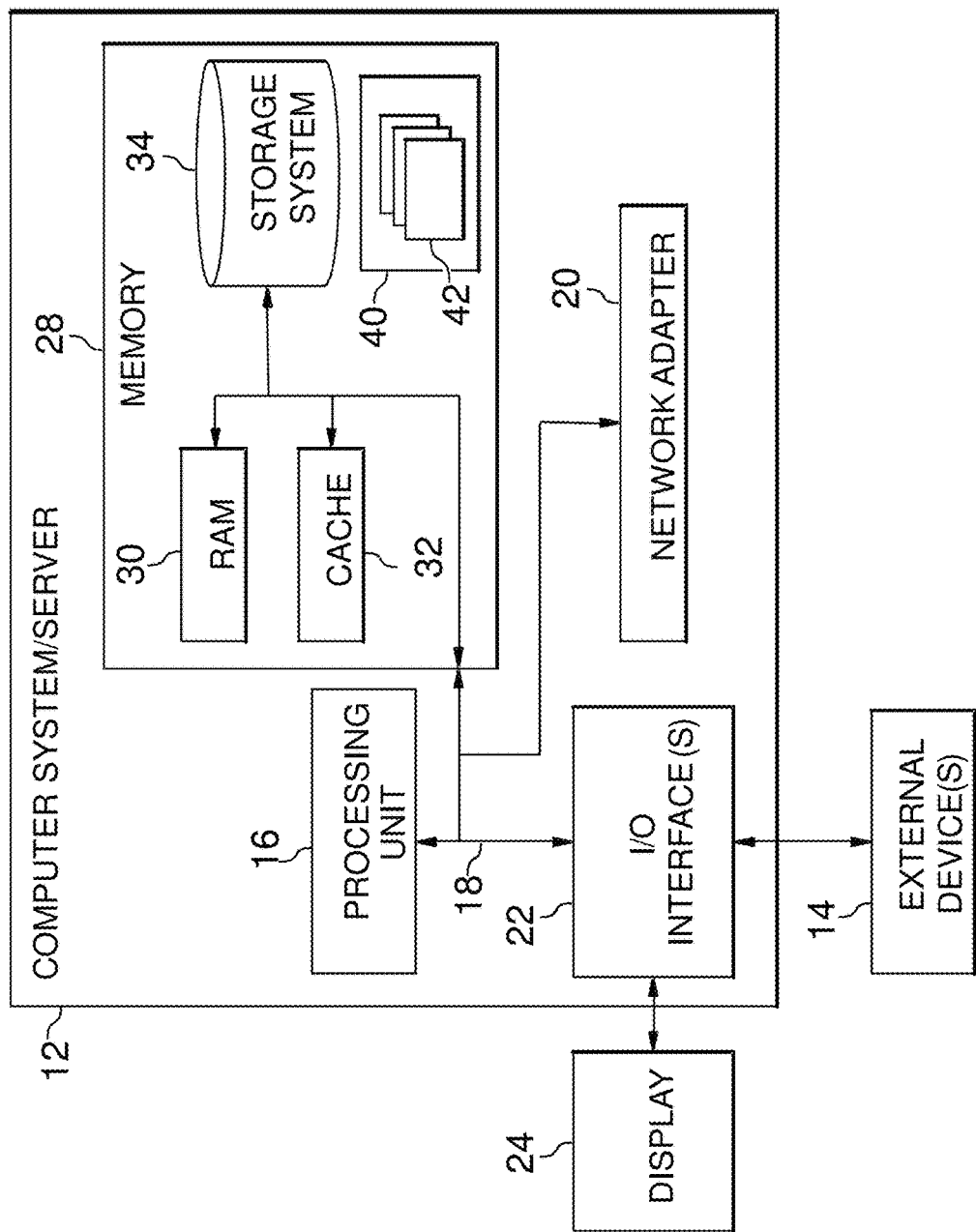
FIG. 1 depicts a cloud computing node according to an embodiment of the present invention.

The present invention generally relates to resolving status and synchronization discrepancies in a distributed environment, more particularly, to resolving status and synchronization discrepancies in a distributed environment using blockchains. In a distributed cloud computing environment, multiple different components within different service provider cloud networks may be interdependent for providing applications and services. For example, data may need to be replicated across multiple different cloud components in connection with providing applications and/or services to end-users. With consideration to this dependency, aspects of the present invention facilitate the completion of data processing, replication, and/or synchronization of transactions in an accurate, timely, and secure manner. Further, aspects of the present invention provide a secure end-to-end transaction ecosystem, which is critical for ensuring accurate synchronization of data.

In embodiments, aspects of the present invention may monitor transactions within a blockchain to determine the status of relationships between members in a cloud network (e.g., cloud components, such as database servers, application servers, server sub-components, etc.). More specifically, the blockchain may indicate the status of whether replicated data associated with interdependent components are in sync (e.g., based on metadata associated with each transaction stored within the blockchain).

Aspects of the present invention may present a report of the status of each relationship and component at different levels within a cloud network. For example, aspects of the present invention may present a report that shows a hierarchal representation of a cloud network, and the status of components within the cloud network. In this way, an individual component with an asynchronous or discrepant status can be quickly identified and resolved. In embodiments, cloud networks having a discrepant status may be temporarily taken offline to prevent those cloud networks from implementing services using asynchronous data. Further, aspects of the present invention may resolve discrepant statuses automatically over a relatively short period of time such that data from all components within a cloud network are in sync and properly replicated, thus reducing downtime of services and reducing issues that arise when data is asynchonous. That is to say, over a period of time, components in a cloud network may reach "consensus" in which data from all components are in agreement.

In embodiments, discrepancies may be resolved by analyzing the transactions on the blockchain and determining which data is the latest data to be replicated, and/or which data has metadata that matches a majority of the metadata across all other components (e.g., as can be determined based on transactions within the blockchain). By analyzing blockchain transactions, the status of each component can be determined in a relatively fast, secure, and accurate manner. Further, resolving discrepancies is highly secure since resolving discrepancies includes updating the blockchain, which can only be completed by a secure device that is authorized to write data to, or modify data within the blockchain.

Aspects of the present invention may be incorporated in any cloud-based application or service for providing secure end-to-end data processing in which data is replicated across multiple cloud networks and/or multiple cloud component members within a cloud network. As an example, aspects of the present invention may be incorporated in a file sharing system where an electronic document is shared from one device to another device via a cloud-based file sharing system in which the electronic document is replicated throughout numerous cloud networks. As another example, aspects of the present invention may be incorporated in a file back-up/recovery system, a communications system, and/or any other application or service in which data and communications is replicated across multiple cloud networks.

Aspects of the present invention may analyze transactions for hundreds of thousands, or potentially millions of data files that are replicated across different components within different layers of a cloud network. Further, aspects of the present invention compare potentially millions of transactions to determine discrepant data. As such, aspects of the present invention cannot be carried out in the human mind or with pen and paper. Further, aspects of the present invention improve the performance of cloud computing systems by reducing the number instances in which discrepant data exists, and thus, reducing downtime for cloud-based applications and services. Aspects of the present invention incorporate blockchain technology, which is necessarily rooted in computer technology and has no counterpart to the pre-computing world.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
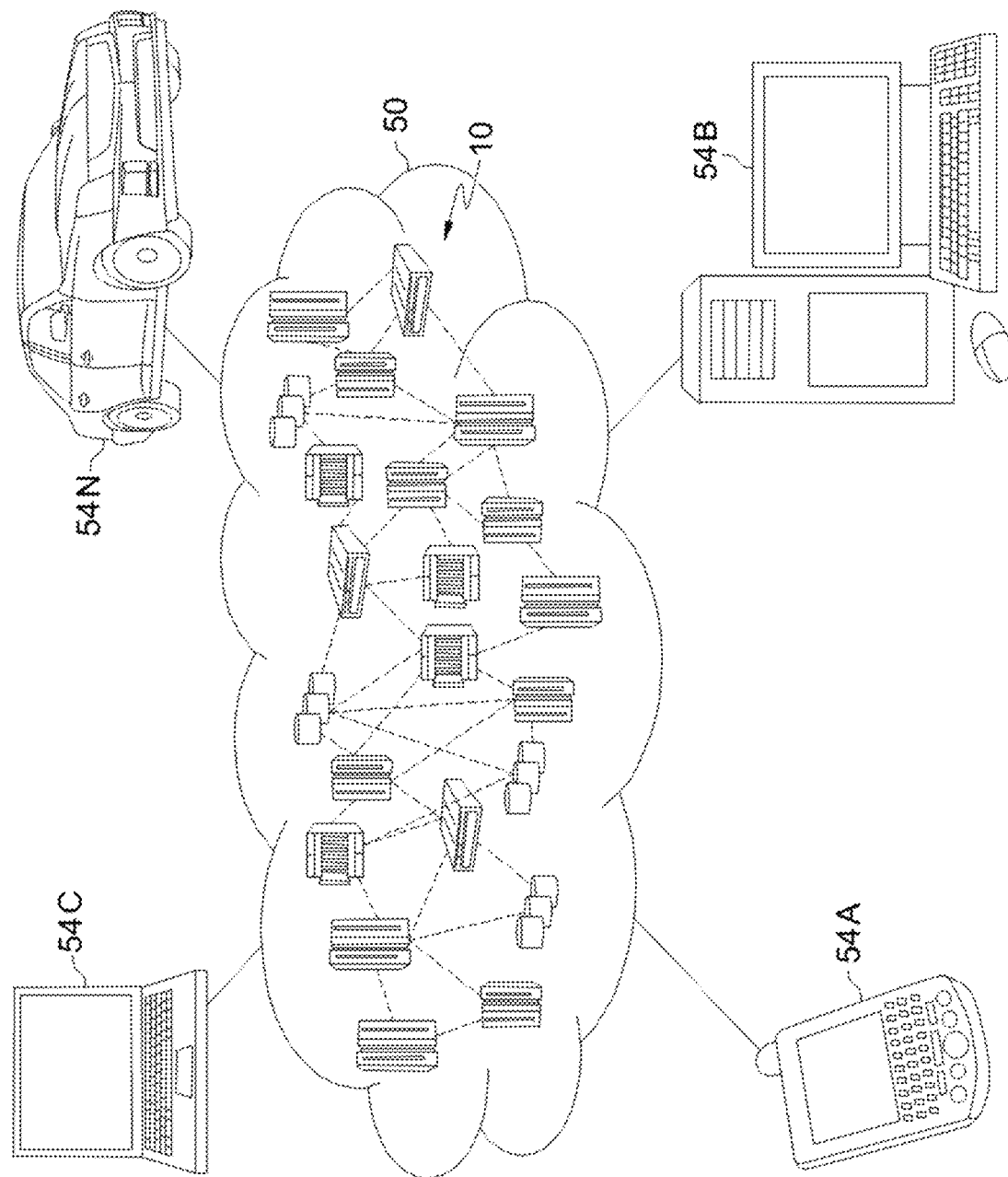
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
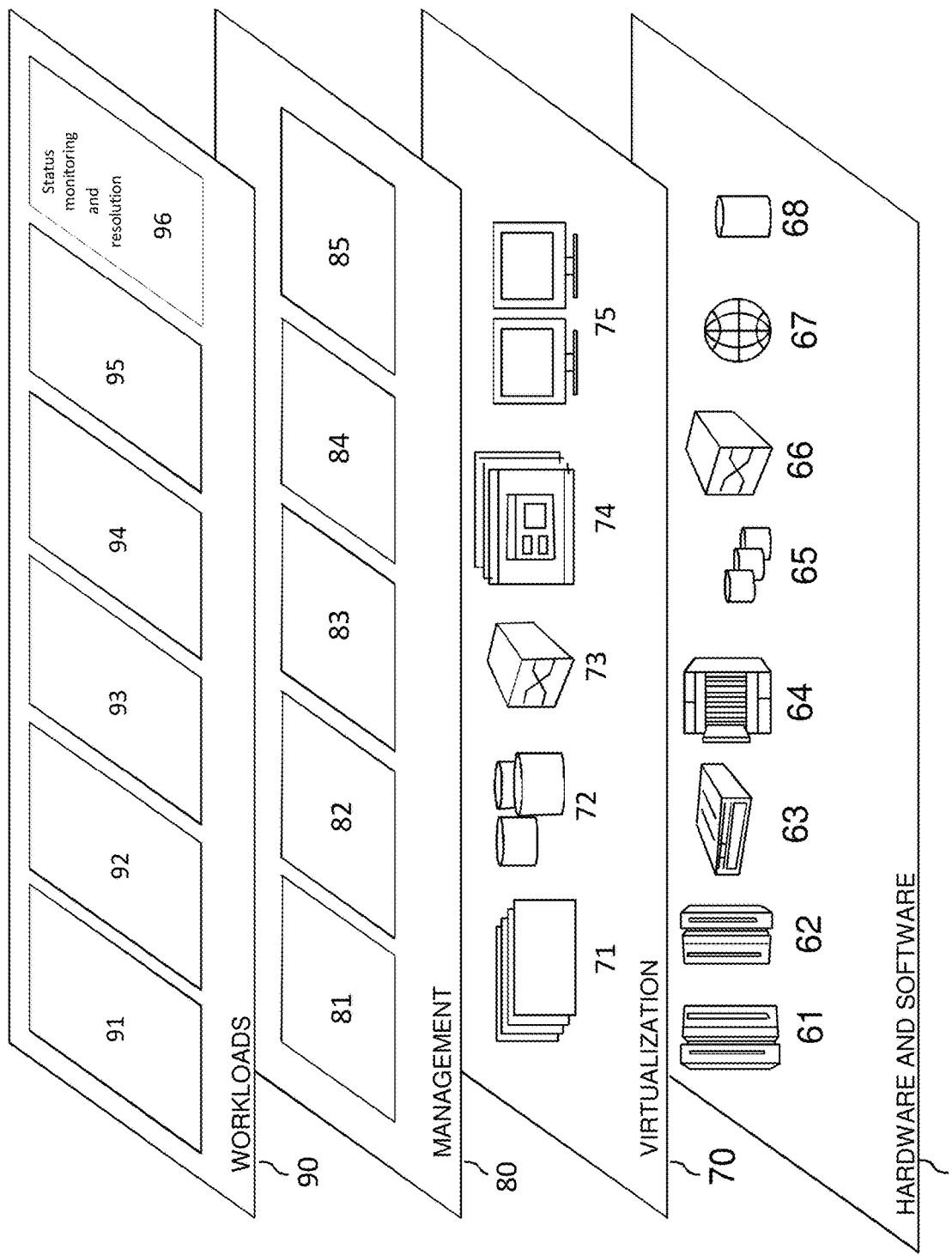
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and status monitoring and resolution 96.

Referring back to FIG. 1, the program/utility 40 may include one or more program modules 42 that generally carry out the functions and/or methodologies of embodiments of the invention as described herein (e.g., such as the functionality provided by status monitoring and resolution 96). Specifically, the program modules 42 may monitor blockchain transactions relating to data synchronization status between component members, determine and report the status of each layer in a cloud network, determine conflicts in the status, determine status conflict resolution, and update the blockchain to resolve the conflict. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a status monitoring and resolution system 230 as shown in FIG. 4.

Figure 4A:
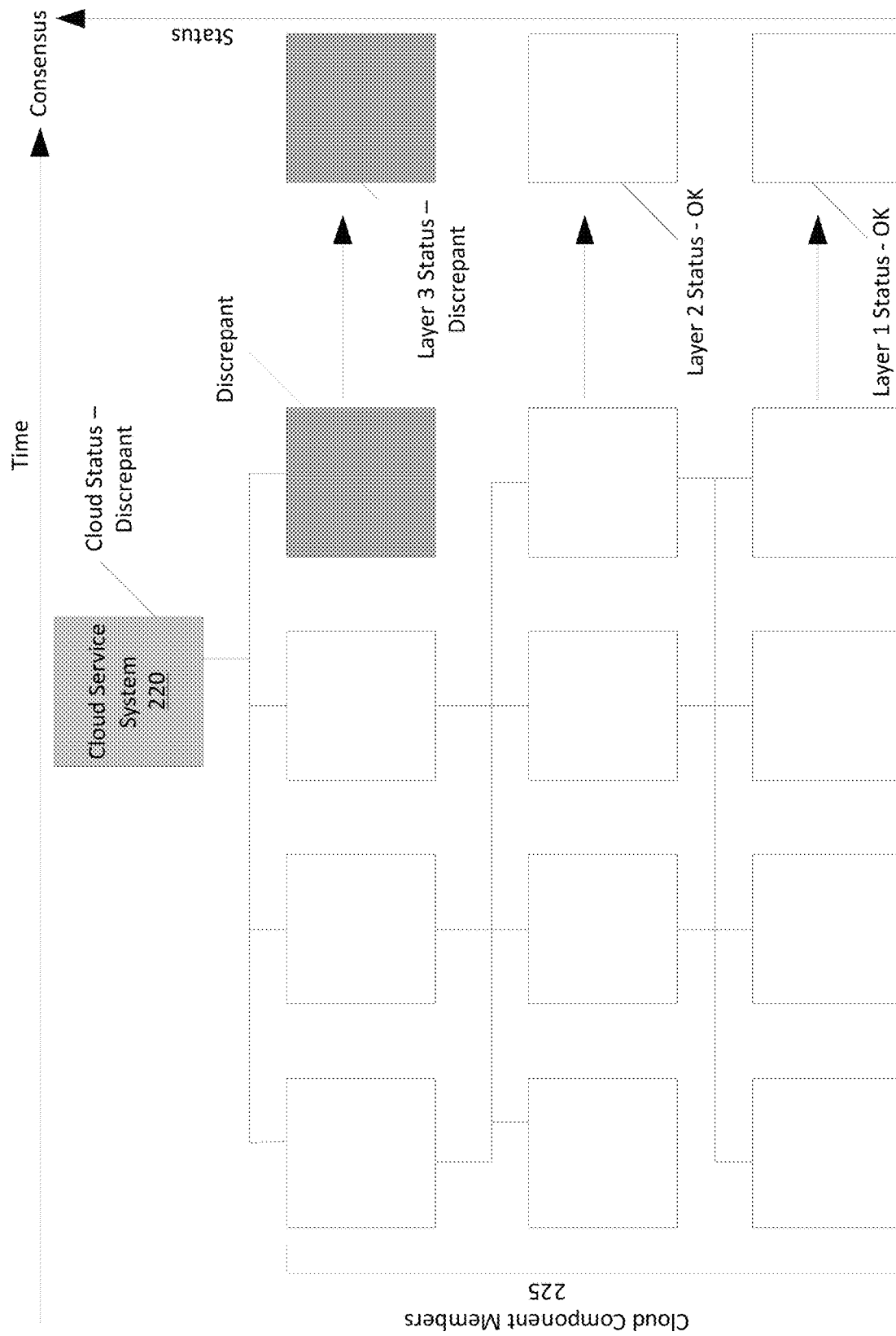
FIGS. 4A and 4B show an overview of an example implementation in accordance with aspects of the present invention.
Figure 4B:
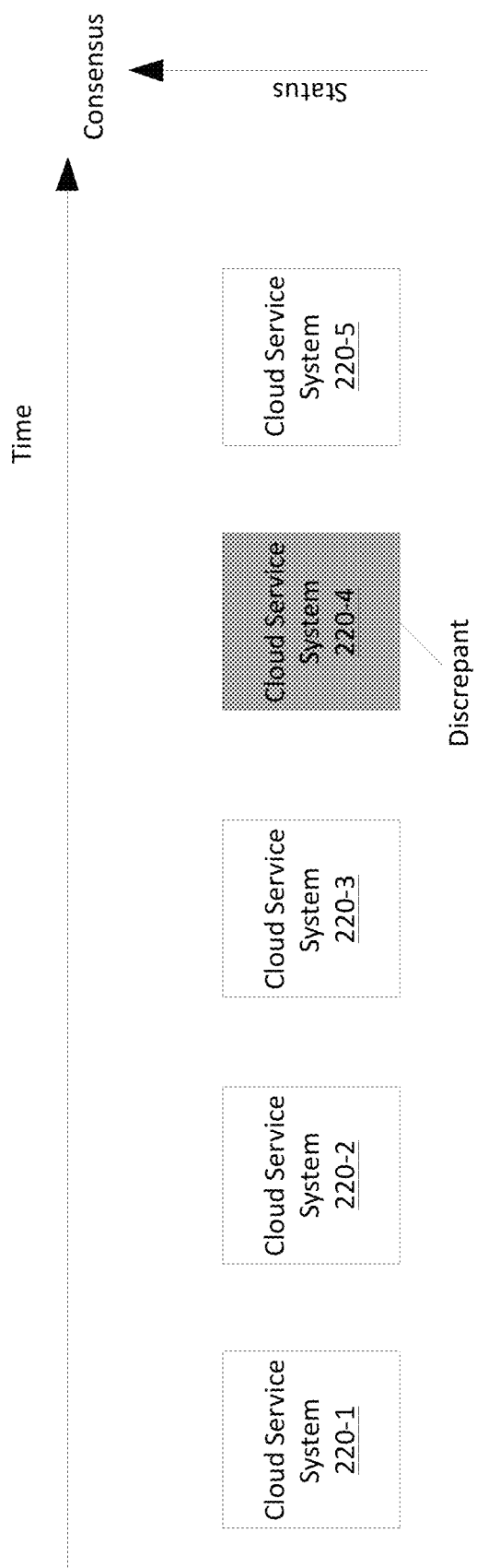

FIGS. 4A and 4B show an overview of an example implementation in accordance with aspects of the present invention. As shown FIG. 4A, a cloud service system 220 may include multiple different layers of cloud component members 225. The cloud service system 220 may provide a cloud-based application or service using data processed and/or replicated by the cloud component members 225 and/or replicated by other cloud service systems 220. Each layer may include a group of a particular type of cloud component members 225 (e.g., an applications layer, a database layer, etc.). Data is replicated between each cloud component member 225 within each layer, and replicated upwards towards the cloud service system 220. As described herein, the relationship status (e.g., data replication status) between each cloud component member 225 within each layer of the cloud service system 220 may be determined by monitoring blockchain transactions representing data replicated across each cloud component member 225. For example, a status monitoring and resolution system 230 (shown in FIG. 5) may monitor the blockchain transactions and determine metadata represented by the blockchain transactions. If the metadata between two cloud component members 225 does not match, the cloud component member 225 having metadata different than that of the other cloud component members 225 is considered discrepant.

As shown in FIG. 4A, the status (e.g., synchronization status) of each cloud component member 225 is represented as either "OK" (with a white shading) or "Discrepant" (with a grey shading). Similarly, the status of each layer is represented as either "OK" (with a white shading) or "Discrepant" (with a grey shading). For example, if a layer includes a discrepant cloud component member 225, that layer is also considered discrepant. Further, the overall status of the entire cloud service system 220 is represented as either "OK" (with a white shading) or "Discrepant" (with a grey shading). For example, if the cloud service system 220 includes a layer that is discrepant, the entire cloud service system 220 may be considered discrepant and represented as such. The overall status of the cloud service system 220 in the hierarchical format shown in FIG. 4A may be presented visually in a report such that an administrator may view the status, and "drill down" at each layer to determine a "culprit" or discrepant cloud component member 225. In embodiments, the status of each cloud component member 225 may be color-coded or shaded differently based on its status. As a cloud service system 220 may include dozens, hundreds, or even thousands of physical and virtual cloud component members 225, the report allows an administrator to quickly and visually identify discrepant cloud component members 225 to further investigate and resolve the discrepancy. Additionally, or alternatively, the discrepancy can be automatically resolved such that, over a period of time, the status of the cloud service system 220 and the cloud component members 225 are driven towards "consensus" in which all data replicated is iteratively resolved over time and synchronized.

In embodiments, different blockchains may be implemented at different layers and levels. For example, a "component blockchain" may include a ledger that represents the status of each cloud component member 225 at a particular time. A "member relationship blockchain" may include information describing the relationship status between two or more cloud component members 225. Additionally, or alternatively, a "clouds blockchain" may include a ledger that represents the status of an individual cloud service system 220 as well as a result of a computation describing the overall consensus status of all rolled up statues of the cloud component members 225 within the cloud service system 220. As such, aspects of the present invention may use multi-level blockchains to store information regarding data replication status at each level in a cloud service system. Since multi-level blockchains are used, the integrity of data replication synchronization status is maintained to prevent the possibility of inaccurate status being reported and used to resolve discrepancies.

In embodiments, aspects of the present invention may incorporate blockchain into the end-to-end flow to manage multipart, multi-vendor distributed security of each transaction as part of a multi-dimensional chain of blockchain ledgers (e.g., the multi-level blockchain). Transactions from each lower level blockchain (e.g., each component blockchain) indicating status are summarized at higher level blockchains (e.g., relationship blockchains and cloud blockchains). Aspects of the present invention provide third dimension of utilization corresponding to the multi-level blockchain. For example, a three-dimensional (or multi-dimensional or multi-level) blockchain can be utilized as a tensor such that the additional dimension holds CPU utilization. The information can be used to support compute availability. The blockchain can be mapped to any degree tensor. Each of the components in the tensor can be modeled by a distribution. The components are combined into any number of component mixtures. As a result, availability clusters are created.

As described herein, a discrepancy in data between two cloud component members 225 can be resolved manually by an administrator such that as each discrepancy is resolved over time, all of the cloud component members 225 within a cloud service system 220 are driven towards consensus. As each discrepancy is resolved, the statuses can be refreshed to identify additional discrepancies that may still exist.

In embodiments, a discrepancy in data between two cloud component members 225 can be resolved automatically (e.g., by the status monitoring and resolution system 230) by determining which of the two cloud component members 225 is "correct" or has the correct version of data. In embodiments, the status monitoring and resolution system 230 may analyze metadata from the transactions in the blockchain. For example, the status monitoring and resolution system 230 may determine date/time modified, version history, author of last modification, and/or other metadata that may indicate the correct version of data to be replicated. Additionally, or alternatively, the status monitoring and resolution system 230 may analyze metadata from the transactions from other cloud component members 225 within the same layer and/or cloud service system 220. The status monitoring and resolution system 230 may determine the metadata that exists in a majority of cloud component members 225, and that the set of metadata that exists in the majority is the correct set of metadata. Accordingly, discrepant cloud component members 225 can be updated with the data associated with the correct set of metadata.

Referring to FIG. 4B, the status of multiple cloud service systems 220 may be tracked and presented. As described herein, the status of each cloud service system 220 may be based on the aggregate status of the layers and cloud component members 225 within each cloud service system 220. In the example shown, cloud service system 220-4 is discrepant (e.g., when one or more layers within the cloud service system 220-4) is discrepant. Over a period of time, all of the cloud service systems 220 are driver to consensus, thus minimizing downtown and/or inaccurate data replications within each cloud service system 220.

Figure 5:
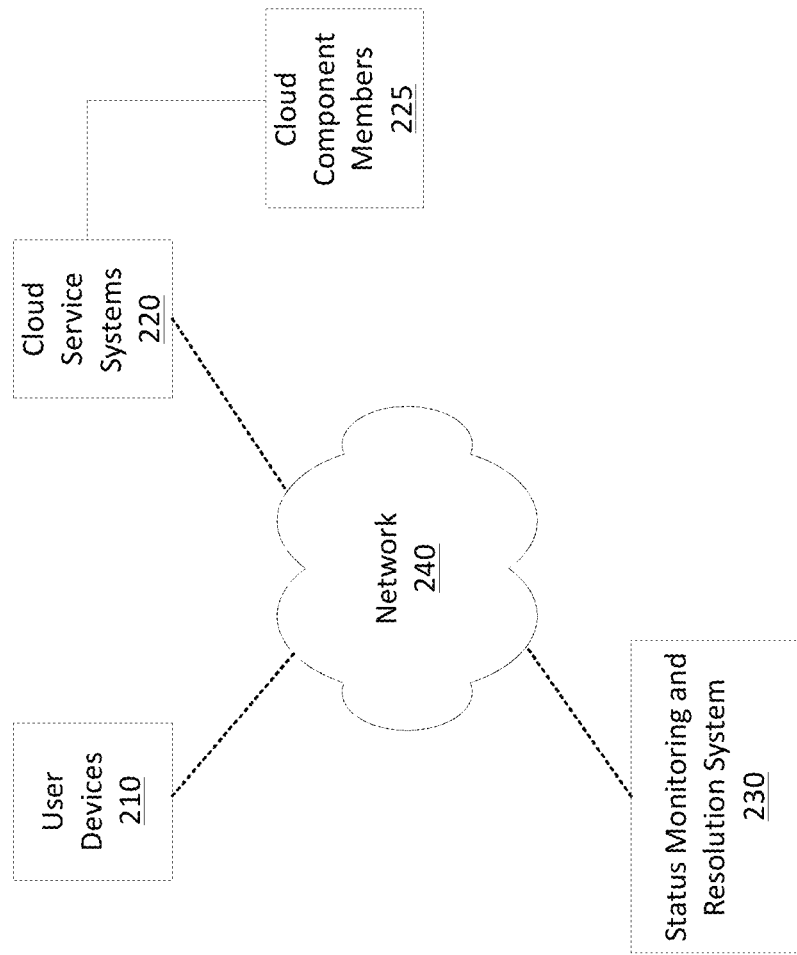
FIG. 5 shows an example environment in accordance with aspects of the present invention.
Figure 5:

FIG. 5 shows an example environment in accordance with aspects of the present invention. As shown in FIG. 5, environment 500 may include user devices 210, cloud service systems 220, status monitoring and resolution system 230, and network 240. In embodiments, one or more components in environment 500 may correspond to one or more components in the cloud computing environment of FIG. 2. In embodiments, one or more components in environment 500 may include the components of computer system/server 12 of FIG. 1.

The user device 210 may include a device capable of communicating via a network, such as the network 240. For example, the user device 210 may correspond to a mobile communication device (e.g., a smart phone or a personal digital assistant (PDA)), a portable computer device (e.g., a laptop or a tablet computer), a desktop computer, a server device, and/or another type of device. In some embodiments, the user device 210 may access one or more cloud service systems 220 to access a cloud-based application or service.

The cloud service system 220 may include one or more computing devices (e.g., such as computer system/server 12 of FIG. 1) hosting a cloud-based application or service accessible by end users via a user device 210. In embodiments, the cloud service system 220 may include cloud component members 225, such as virtual and/or physical application servers, database servers, and/or other types of servers that support the functionality of the cloud-based application hosted by the cloud service system 220. In embodiments, data used for implementing applications and services may be replicated across the cloud component members 225. In embodiments, communications between the cloud component members 225 may be recorded as blockchain transactions in which each communication is associated with a set of metadata.

The status monitoring and resolution system 230 may include one or more computing devices (e.g., such as computer system/server 12 of FIG. 1) that monitors blockchain transactions associated with communications within each cloud service system 220 and within each cloud component member 225. As described herein, the status monitoring and resolution system 230 may monitor the blockchain transactions, identify discrepancies in relationships between one or more cloud component members 225 based on the block chain transactions, determine and report the status of each layer in a cloud network, determine conflicts in the status, determine status conflict resolution, and update the blockchain to resolve the conflict.

The network 240 may include network nodes, such as network nodes 10 of FIG. 2. Additionally, or alternatively, the network 240 may include one or more wired and/or wireless networks. For example, the network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
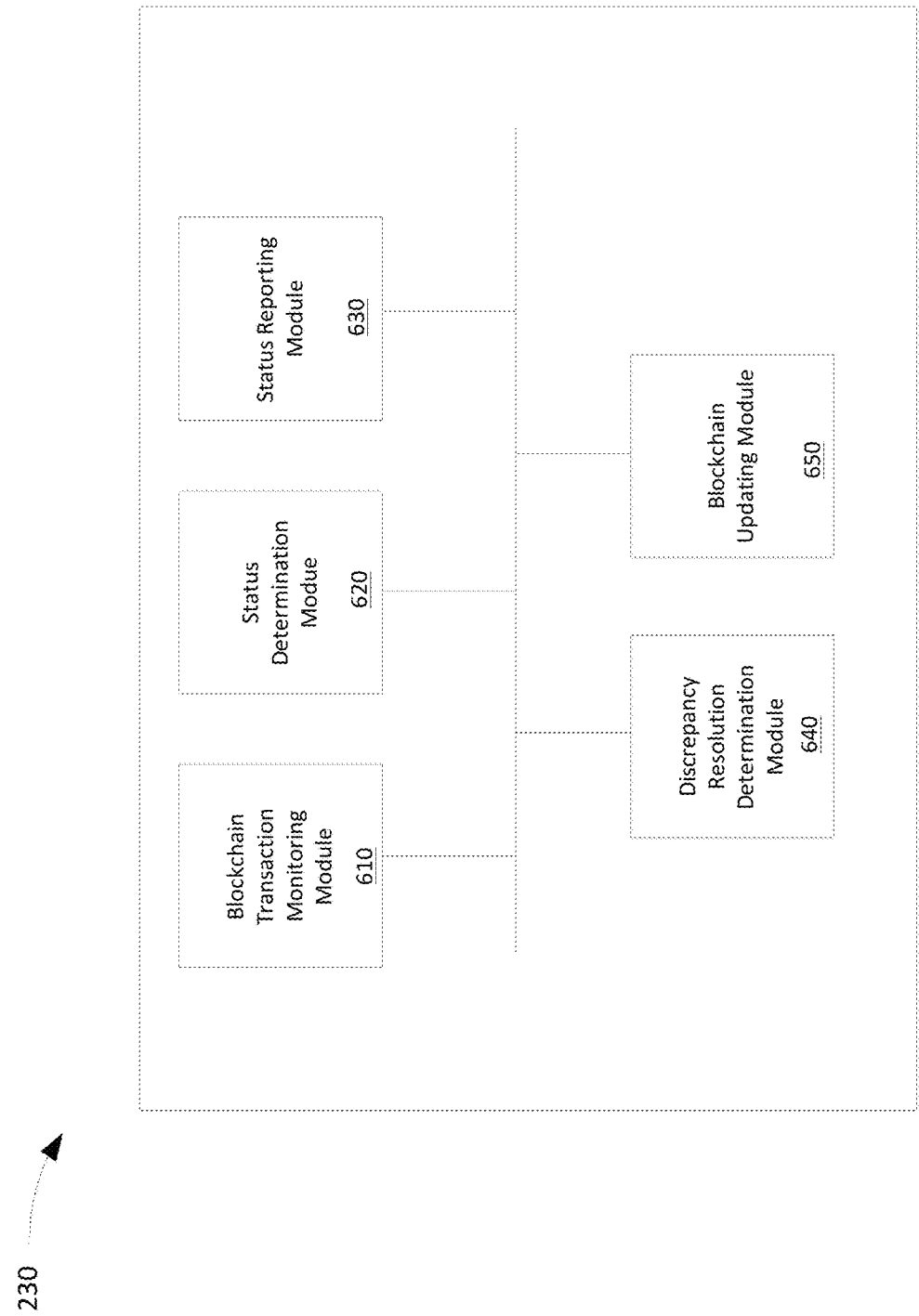
FIG. 6 shows a block diagram of example components of a status monitoring and resolution system in accordance with aspects of the present invention.

FIG. 6 shows a block diagram of example components of a status monitoring and resolution system 230 in accordance with aspects of the present invention. As shown in FIG. 6, the status monitoring and resolution system 230 may include a blockchain transaction monitoring module 610, status determination module 620, status reporting module 630, discrepancy resolution determination module 640, and a blockchain updating module 650. In embodiments, the status monitoring and resolution system 230 may include additional or fewer components than those shown in FIG. 6. In embodiments, separate components may be integrated into a single computing component or module. Additionally, or alternatively, a single component may be implemented as multiple computing components or modules.

The blockchain transaction monitoring module 610 may include a program module (e.g., program module 42 of FIG. 1) that monitors blockchain transactions relating to data synchronization status between cloud component members 225. In embodiments, the blockchain transaction monitoring module 610 may monitor a "component member blockchain" to monitor transactions representing data replicated across the cloud component members 225. As described herein, each cloud component member 225 may write to the "component member blockchain" indicating the availability of the cloud component member 225 (e.g., as determined based on self-check processes) as well as the metadata of replicated data. Alternatively, the blockchain updating module 650 may write to the component member blockchain on behalf of the cloud component members 225. In embodiments, each cloud component member 225 that is authorized to be included in a cloud service system 220 may each receive an invitation to write to the component member blockchain or to have the blockchain updating module 650 write to the component member blockchain on its behalf. In this way, only authorized devices may write written to the component member blockchain (or have transactions written to the component member blockchain), to prevent fraudulent data from corrupting the status information of a cloud service system 220.

The status determination module 620 may include a program module (e.g., program module 42 of FIG. 1) that determines the status of one or more cloud component members 225 within a cloud service system 220. For example, the status determination module 620 may determine a relationship status between two or more cloud component members 225 by comparing metadata for a communication (e.g., found in the component member blockchain monitored by the blockchain transaction monitoring module 610). Each communication may have a set of replicated data with metadata embedded within the set of replicated data. For the communication, the status determination module 620 may compare the metadata for the set of replicated data stored by one cloud component member 225 with the metadata for the set of replicated data stored by another cloud component member 225. If the metadata matches, the status monitoring and resolution system 230 may determine that the replicated data is not discrepant. The status determination module 620 may output information indicating the status to the blockchain updating module 650 so that the blockchain updating module 650 can store information regarding the relationship status between the cloud component members 225 in a "member relationship blockchain."

The status reporting module 630 may include a program module (e.g., program module 42 of FIG. 1) that reports the status (e.g., availability and/or relationship status) of each of the cloud component members 225 at each layer in a cloud service system 220 (e.g., as determined by the status determination module 620). In embodiments, the statuses may be visually presented in a hierarchal manner (e.g., as shown in FIG. 4A) to identify the cloud component members 225 and layers within a cloud service system 220 that have a discrepant status. In this way, cloud component members 225 that are discrepant (e.g., have metadata of replicated data not matching the metadata of other cloud component members 225 in the cloud service system 220), may be easily identified to resolve the discrepancies.

The discrepancy resolution determination module 640 may include a program module (e.g., program module 42 of FIG. 1) that resolves discrepancies (determined based on status determined by the status determination module 620) between cloud component members 225 such that all cloud component members 225 in a layer, and in turn, all cloud component members 225 in a cloud service system 220 are no longer discrepant. For example, the discrepancy resolution determination module 640 may determine that two cloud component members 225 are discrepant between each other when metadata of replicated data does not match. The discrepancy resolution determination module 640 may determine which set of replicated data is the correct set based on one or more factors. For example, the discrepancy resolution determination module 640 may determine the correct set of replicated data based on metadata indicating a date of the replicated data, an author, a version number, or the like. Additionally, or alternatively, the discrepancy resolution determination module 640 may determine the correct set of replicated data based on the metadata of the replicated data from other cloud component members 225 in the same layer or same cloud service system 220. For example, the discrepancy resolution determination module 640 may determine that the correct set of replicated data is the one that is replicated across a majority of the cloud component members 225 (e.g., as determined based on information stored in the component member blockchain that identifies the replicated data and its metadata). Specifically, the discrepancy resolution determination module 640 may access the component member blockchain, and identify the metadata that is associated with a majority of the cloud component members 225 for the set of replicated data as the "correct" set of replicated data. The discrepancy resolution determination module 640 may determine that the discrepant cloud component member 225 should be resynced with the correct set of replicated data in order to resolve the discrepancy.

In embodiments, the discrepancy resolution determination module 640 may generate discrepancy resolution instructions to resolve the discrepancy. The discrepancy resolution determination module 640 may output the instructions to discrepant cloud component members 225 so that the discrepant cloud component members 225 may resync replicated data with the correct set, and update the component member blockchain. In turn, the relationship member blockchain is also updated based on the updated component member blockchain, and the clouds blockchain is updated based on the updated relationship member blockchain.

The blockchain updating module 650 may include a program module (e.g., program module 42 of FIG. 1) that updates blockchains based on changes made to data replicated across the cloud component members 225. In embodiments, the blockchain updating module 650 may update a component member blockchain on behalf of a cloud component member 225 when replicated data is updated (e.g., as part of a discrepancy resolution, or when data is updated during the course of providing an application or service). Additionally, or alternatively, the blockchain updating module 650 may update a relationship member blockchain when the component member blockchain is updated. For example, a change in the component member blockchain may result in a change in the relationship member blockchain if two cloud component members 225 are no longer in agreement, or vice versa if two cloud service systems 220 were previously not in agreement, but are now in agreement after an update to the replicated data and the transactions that record the metadata associated with the replicated data. Additionally, or alternatively, the blockchain updating module 650 may update the cloud blockchain based on changes to the relationship member blockchain and/or changes to the component member blockchain. Updates to the blockchain may be presented by the status reporting module 630 such that updated status can be visually presented to identify any remaining discrepancies. As described herein, over a period of time, the blockchain updating module 650 may continue to update all blockchains until agreements exist between all the blockchains, and all data is replicated accurately across multiple cloud component members 225 and cloud service systems 220.

Figure 7:
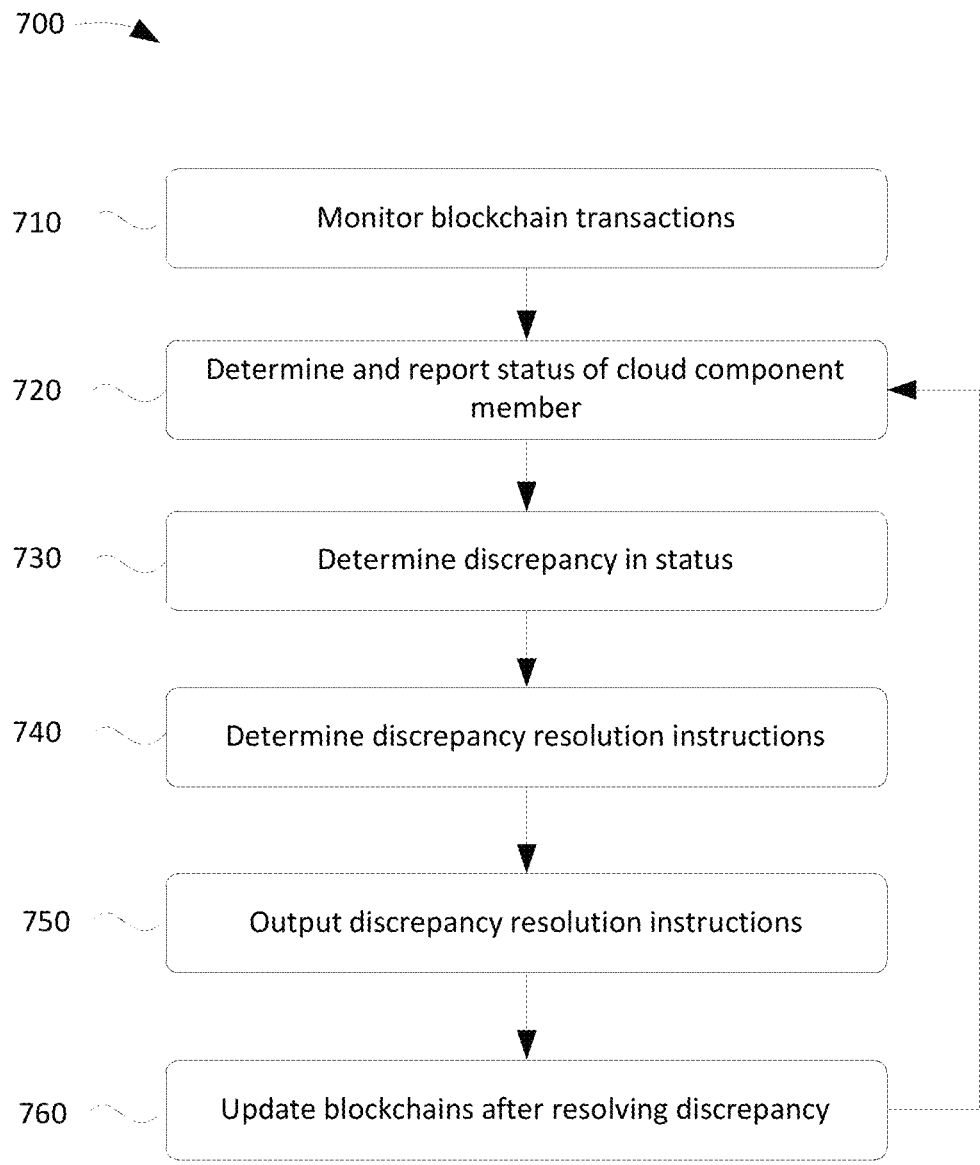
FIG. 7 shows an example flowchart for driving cloud component members and cloud service systems towards consensus over a period of time using multi-level blockchains in accordance with aspects of the present invention.

FIG. 7 shows an example flowchart of a process for driving cloud component members and cloud service systems towards consensus over a period of time using multi-level blockchains. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 may include monitoring blockchain transactions, (step 710). For example, as described above with respect to the blockchain transaction monitoring module 610, the status monitoring and resolution system 230 may monitor blockchain transactions relating to data synchronization status between cloud component members 225. In embodiments, the blockchain transaction monitoring module 610 may monitor a "component member blockchain" to monitor transactions representing data replicated across the cloud component members 225.

Process 700 may also include determining and reporting the status of each cloud component member (step 720). For example, as described above with respect to the status determination module 620 and the status reporting module 630, the status monitoring and resolution system 230 may determine a relationship status (e.g., synchronization status) between two or more cloud component members 225 by comparing metadata for a communication (e.g., found in the component member blockchain monitored by the blockchain transaction monitoring module 610). If the metadata matches between two cloud service systems 220, the status monitoring and resolution system 230 may determine that the status of the cloud component members 225 is verified or non-discrepant. Further, the status monitoring and resolution system 230 may report the status (e.g., availability and/or relationship status) of each of the cloud component members 225 at each layer in a cloud service system 220 (e.g., as determined by the status determination module 620). In embodiments, the statuses may be visually presented in a hierarchal manner (e.g., as shown in FIG. 4A) to identify the cloud component members 225 and layers within a cloud service system 220 that have a discrepant status. In embodiments, the status monitoring and resolution system 230 may update a relationship member blockchain based on the relationship status. That is, the status monitoring and resolution system 230 may monitor the blockchain transactions from a component member blockchain (e.g., at step 710), determine the relationship status between the cloud component members 225, and update the relationship member blockchain based on the relationship status.

Process 700 may further include determining a discrepancy in status (step 730). For example, as described above with respect to the status determination module 620 and the discrepancy resolution determination module 640, the status monitoring and resolution system 230 may determine a discrepancy in the status between two cloud component members 225 based on comparing the metadata for a set of replicated data associated with a communication. For example, each communication may have a set of replicated data with metadata embedded within the set of replicated data. For the communication, the status monitoring and resolution system 230 may compare the metadata for the set of replicated data stored by one cloud component member 225 with the metadata for the set of replicated data stored by another cloud component member 225. If the metadata matches, the status monitoring and resolution system 230 may determine that the replicated data is not discrepant. In embodiments, the status monitoring and resolution system 230 may determine a discrepancy in status based on the transactions included in the relationship member blockchain.

Process 700 may also include determining discrepancy resolution instructions (step 740) and outputting the discrepancy resolution instructions (step 750). For example, as described above with respect to the discrepancy resolution determination module 640 and step 730, the status monitoring and resolution system 230 may determine that two cloud component members 225 are discrepant between each other when metadata of replicated data does not match. The status monitoring and resolution system 230 may determine which set of replicated data is the correct set based on one or more factors. For example, the status monitoring and resolution system 230 may determine the correct set of replicated data based on metadata indicating a date of the replicated data, an author, a version number, or the like. Additionally, or alternatively, the status monitoring and resolution system 230 may determine the correct set of replicated data based on the metadata of the replicated data from other cloud component members 225 in the same layer or same cloud service system 220. The status monitoring and resolution system 230 may generate discrepancy resolution instructions to resolve the discrepancy in which the instruction directs a discrepant cloud component member 225 to resync data with the determined correct set of replicated data.

In embodiments, the discrepancy resolution instructions may be manually provided by an administrator. Additionally, or alternatively, the discrepancy resolution instructions that are automatically generated by the status monitoring and resolution system 230 may be manually modified. The status monitoring and resolution system 230 may output the instructions to discrepant cloud component members 225 so that the discrepant cloud component members 225 may resync replicated data with the correct set, and update the component member blockchain.

Process 700 may further include updating blockchains after resolving the discrepancy (step 760). For example, as described above with respect to the blockchain updating module 650, the status monitoring and resolution system 230 may update blockchains (e.g., the component member blockchain, the relationship member blockchain, and/or the clouds blockchain) based on changes made to data replicated across the cloud component members 225. In embodiments, the status monitoring and resolution system 230 may update a component member blockchain on behalf of a cloud component member 225 when replicated data is updated (e.g., as part of a discrepancy resolution, or when data is updated during the course of providing an application or service). Additionally, or alternatively, the status monitoring and resolution system 230 may update a relationship member blockchain when the component member blockchain is updated (e.g., to capture updates in relationship status after discrepancies have been resolved). For example, a change in the component member blockchain may result in a change in the relationship member blockchain if two cloud component members 225 are no longer in agreement, or vice versa if two cloud service systems 220 were previously not in agreement, but are now in agreement after an update to the replicated data and the transactions that record the metadata associated with the replicated data. Additionally, or alternatively, the status monitoring and resolution system 230 may update the cloud blockchain based on changes to the relationship member blockchain and/or changes to the component member blockchain.

Process 700 may return to step 720 in which the status of cloud component members is determined and reported after discrepancy resolutions have been incorporated and after the blockchains have been updated. In this way, any subsequent discrepancies that stemmed from lower-level discrepancies can be identified and resolved. Over a period of time, and in accordance with process 700, the status monitoring and resolution system 230 may continue to update all blockchains until agreements exist between all the blockchains, and all data is replicated accurately across multiple cloud component members 225 and cloud service systems 220. In this way, each discrepancy in a cloud service system 220 may be iteratively resolved such that over a period of time, all discrepancies are resolved and all blockchains and cloud component member 225 are driven to consensus.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   monitoring, by a computing device, first transactions in a first blockchain, wherein the first transactions are associated with a set of data replicated across a plurality of component members in a distributed computing service system;
   updating, by the computing device, second transactions in a second blockchain based on the monitoring the first transactions, wherein the second transactions identify synchronization relationship statuses between the set of data replicated across the plurality of component members;
   determining, by the computing device, synchronization status discrepancies of the set of data replicated across the plurality of component members based on the second transactions;
   outputting, by the computing device, information identifying the synchronization status discrepancies, wherein the outputting the information identifies particular ones of the plurality of component members having discrepant synchronization statuses;

resolving, by the computing device, each of the synchronization status discrepancies; and iteratively updating, by the computing device, the first blockchain to reflect the resolved first discrepancy, and the second blockchain based on updating the first blockchain.

2. The method of claim 1, wherein each of the plurality of component members receives an invitation to write to the first blockchain.

3. The method of claim 1, wherein:

the transactions in the first blockchain identify a first set of metadata associated with a first set of replicated data associated with a first component member and a second set of metadata associated with a second set of replicated data associated with a second component member; and the determining the synchronization status discrepancies comprises determining that the first set of metadata does not match the second set of metadata; and the resolving each of the synchronization status discrepancies comprises generating discrepancy resolution instructions indicating which one of the first set of replicated data and the second set of replicated data should be replicated, and outputting the discrepancy resolution instructions to cause one or more discrepant component members of the plurality of component members to resync the one of the first set of replicated data and the second set of replicated data.

4. The method of claim 1, further comprising outputting information regarding the synchronization relationship status of each of the plurality of component members in a visual report displaying a hierarchy of each of the plurality of component members within a cloud services system.

5. The method of claim 4, further comprising:

determining a relationship status of layers in the cloud services system based on the synchronization relationship status of each of the plurality of component members within each of the layers;

determining a status of the cloud service system based on the synchronization relationship status of the layers; and outputting a report identifying the synchronization relationship status of each of the layers and the cloud service system.

6. The method of claim 1, wherein a service provider at least one of creates, maintains, deploys and supports the computing device.

7. The method of claim 1, wherein the monitoring, the determining, by the computing device, the synchronization status discrepancies, the resolving each of the synchronization status discrepancies, and the iteratively updating the first blockchain are provided by a service provider on a subscription, advertising, and/or fee basis.

8. The method of claim 1, wherein the computing device includes software provided as a service in a cloud environment.

9. The method of claim 1, further comprising deploying a system for resolving status and synchronization discrepancies in a distributed computing environment, comprising providing a computer infrastructure operable to perform the monitoring, the determining the synchronization status discrepancies, the resolving each of the synchronization status discrepancies, and the iteratively updating the first blockchain.

10. A computer program product for resolving status and synchronization discrepancies in a distributed computing environment, the computer program product comprising a computer readable storage medium having program instructions embodied therewith, the program instructions executable by a computing device to cause the computing device to:

monitor first transactions in a first blockchain, wherein the first transactions are associated with a set of data replicated across a plurality of component members within a distributed computing services system;

update second transactions in a second blockchain based on the monitoring the first transactions, wherein the second transactions identify synchronization relationship statuses between the data replicated across the plurality of component members;

determine synchronization status discrepancies of the set of data replicated between the plurality of component members based on the second transactions;

output information identifying the synchronization status discrepancies, wherein the outputting the information identifies particular ones of the plurality of component members having discrepant synchronization statuses;

resolve each of the synchronization status discrepancies; and iteratively update the first blockchain to reflect the resolved discrepancies, and the second blockchain based on the updating the first blockchain.

11. The computer program product of claim 10, wherein the first transactions in the first blockchain are driven towards consensus based on receiving input to resolve the synchronization status discrepancies.

12. The computer program product of claim 10, wherein the outputting the information comprises outputting a visual report displaying a hierarchy of each of the plurality of component members within the distributed computing services system, wherein the distributed computing services system is a cloud services system.

13. The computer program product of claim 12, wherein the program instructions further cause the computing device to:

determine a status of layers in the cloud services system based on the synchronization relationship status of each of the plurality of component members within each layer;

determine a status of the cloud service system based on the synchronization relationship status of the layers; and output a report identifying the synchronization relationship status of each layer and the cloud service system.

14. A system comprising:

a CPU, a computer readable memory and a computer readable storage medium associated with a computing device;

program instructions to monitor first transactions in a first blockchain, wherein the first transactions are associated with a set of data replicated across a plurality of component members in a distributed computing service system;

program instructions to update second transactions in a second blockchain based on the monitoring the first transactions, wherein the second transactions identify synchronization relationship statuses between the data replicated across a plurality of component members;

program instructions to determine synchronization status discrepancies of the set of replicated data between the plurality of component members based on the second transactions;

program instructions to output information identifying the synchronization status discrepancies, wherein the outputting the information identifies particular ones of the plurality of component members having discrepant synchronization statuses;

program instructions to iteratively resolve each of the synchronization status discrepancies; and program instructions to iteratively update the first blockchain to reflect the resolved synchronization status discrepancies, and the second blockchain based on updating the first blockchain, wherein the program instructions are stored on the computer readable storage medium for execution by the CPU via the computer readable memory.

15. The system of claim 14, wherein the outputting information identifying the synchronization status discrepancies comprises providing a visual report displaying a hierarchy of each of the plurality of component members within the distributed computing services system, wherein the distributed computing services system is a cloud services system.

16. The system of claim 14, wherein the iteratively resolving each of the synchronization status discrepancies is based on comparing metadata of data replicated by each plurality of cloud component members.

17. The system of claim 14, wherein:

each of the plurality of component members write the transactions to the blockchain; and monitoring the first transactions in the first blockchain comprises comparing metadata of the first transactions stored by respective ones of the plurality of component members to determine whether the metadata of the respective first transactions match.

18. The system of claim 17, wherein:

the monitoring the first transactions in the first blockchain comprises identifying synchronization status discrepancies of select first transactions of the first blockchain based on the comparing the metadata; and the updating the second transactions in the second blockchain is based on the identified the synchronization status discrepancies, wherein the second transactions identifying synchronization relationship statuses between the data replicated across the plurality of component members include the synchronization status discrepancies.

19. The system of claim 18, wherein the distributed computing services system is a cloud services system, and the system further comprises program instructions to update a third blockchain based on the second blockchain, wherein the third blockchain comprises a ledger representing a synchronization status of the cloud services system and a result of a computation describing an overall synchronization relationship status based on the synchronization relationship statuses of the cloud component members within the cloud services system.

* * * * *